United States Patent Office 2,960,772
Patented Nov. 22, 1960

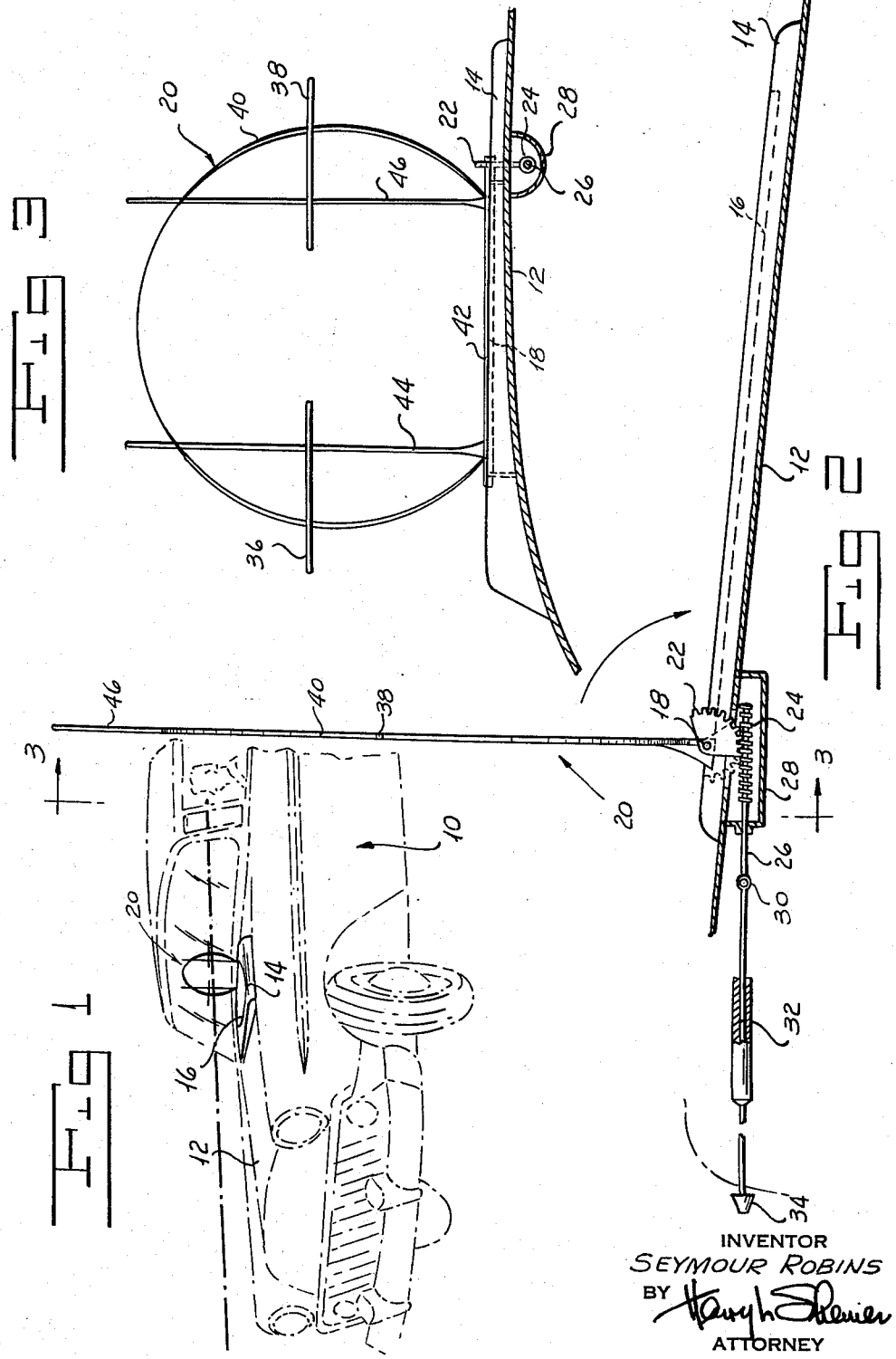

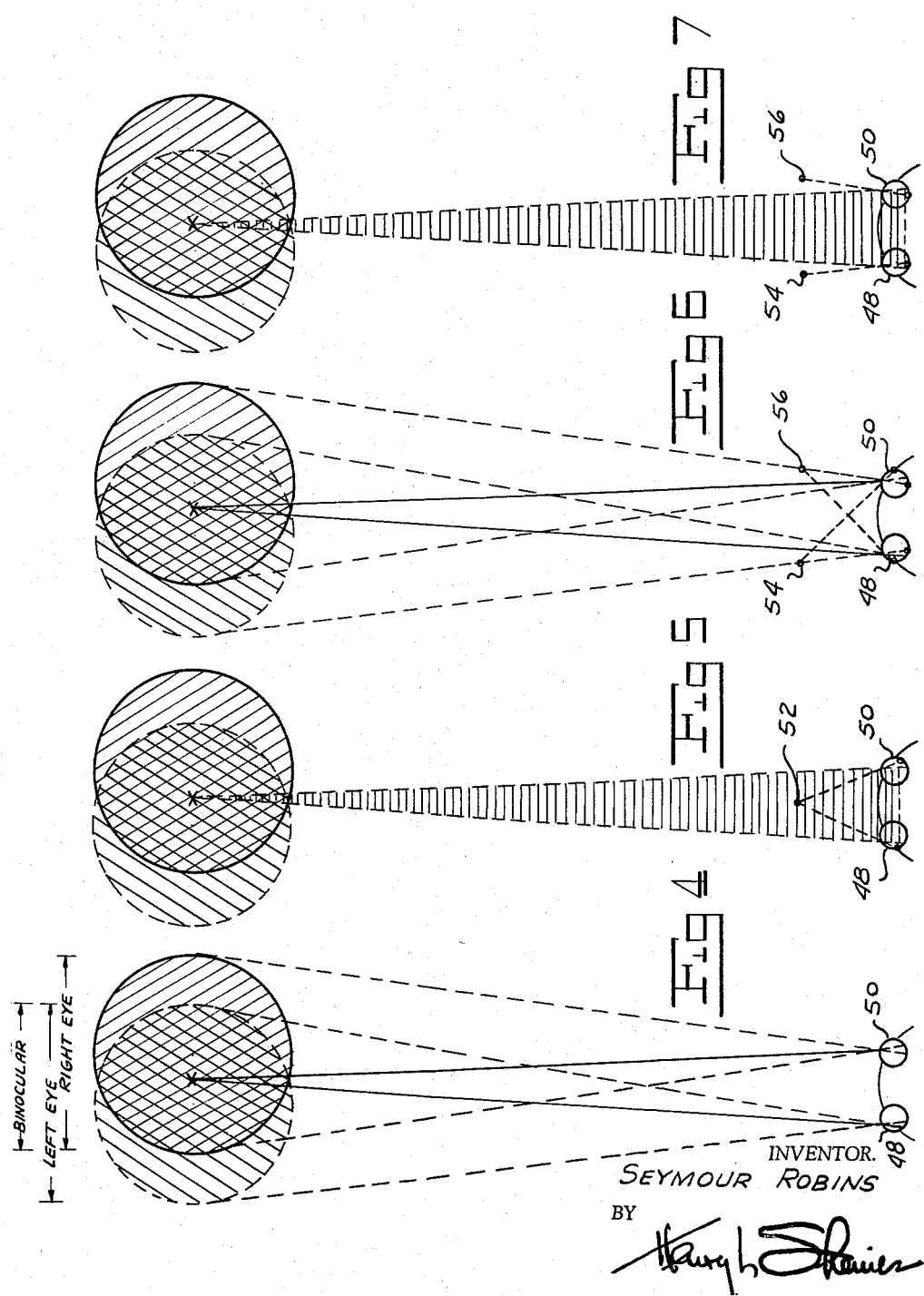

2,960,772

VISUAL AID FOR VEHICLE OPERATOR

Seymour Robins, 125 W. 11th St., New York, N.Y.

Filed Jan. 2, 1958, Ser. No. 706,796

2 Claims. (Cl. 33—64)

My invention relates to a visual aid for a vehicle operator and more particularly to a device which enables the operator of a vehicle to make accurate judgments of the attitude of the vehicle and of the nature of the area through which he is passing.

The perception of size, shape, and distance depends partly on experience and partly on a comparison with other known objects in view. The operator of a moving vehicle, such for example as an automobile, must make accurate judgments of the attitude of his vehicle and of the area through which he is passing in order to govern his actions for safe and efficient operation of the vehicle. In effect, the vehicle is but an extension of the operator's body as he moves through space, and his visual judgments are made in precisely the same manner as in his other motion experiences. When driving a vehicle at high speed, however, the operator's judgment must be quicker and more certain than is necessary when he is moving about under his own power.

The actions of the operator of a vehicle are made in response to a visual evaluation of the area through which he is moving. In making this evaluation of the surrounding area and of the attitude of his vehicle, the operator relies on known objects in his immediate environment in the vehicle to provide him with verticals and horizontals to which he may refer in making judgments. By reference to an apparent vertical in relation to the outside area, he may judge whether or not he is, for example, on a banked curve. An apparent horizontal permits him to determine the rise and fall of the road, for example. In addition he must determine the rate of apparent change in size of objects being approached and of oncoming vehicles. From these determinations, the operator judges his own speed and the speed of oncoming vehicles. These determinations of apparent change in size also are made by reference to the immediate environment of the operator in the vehicle.

The dictates of style have provided modern vehicles with wide curving windshields and with curved contours which fail to provide the driver with verticals and horizontals as guides on which he may rely in making accurate judgments of the attitude and speed of his vehicle and of the speed of oncoming vehicles. These judgments have become extremely important with the advent of modern, high-speed, superhighways. In order to operate a motor vehicle safely on these highways, the driver must make rapid and accurate judgments of the attitude of his vehicle and of the area through which he is traveling.

I have invented a visual aid for vehicle operators which enables the operator to make a rapid and accurate evaluation of the area through which he is traveling to determine the attitude of his vehicle. My device provides the driver with true verticals and horizontals from which judgments can be made. In addition, my device permits the operator to determine rapidly and accurately radial motion and overlay changes of distant objects from which judgments of the distance and speed of movement of distant objects may be made.

One object of my invention is to provide a visual aid for a vehicle operator to permit the operator to make an accurate evaluation of the area through which he is traveling and of the attitude of his vehicle.

Another object of my invention is to provide a visual aid for a vehicle operator which provides the operator with true verticals and horizontals from which he may make judgments.

A further object of my invention is to provide a visual aid for a vehicle operator which provides the operator with means for making rapid and accurate judgments of the distance to and the speed of movement of distant objects.

Other and further objects of my invention will appear from the following description:

In general my invention contemplates the provision of a visual aid for a vehicle operator including a grid mounted on a vehicle in the field of view of the operator. The grid includes horizontal guides intersecting with respective spaced vertical guides. These guides provide true horizontals and verticals with respect to the vehicle, from which accurate judgements of the area through which the vehicle is passing may be made. The spaced vertical guides afford a means for judging distance to objects which are out of the normal range of binocular vision of the operator. The intersecting guides afford a sighting device and assist in determining radial motion and change in apparent size of objects. My grid includes a circular guide which permits judgment of radial motion to be made and assists in determining the change in apparent size of an object being approached. I may provide my visual aid with means for moving it out of the field of view of the driver when not in use.

In the accompanying drawings which form part of the instant specification and which are to be read in conjunction therewith and in which like reference numerals are used to indicate like parts in the various views:

Figure 1 is a fragmentary perspective view of a motor vehicle equipped with my visual aid for vehicle operators.

Figure 2 is a side elevation of my visual aid for vehicle operators showing the manner of raising and lowering the grid.

Figure 3 is a rear elevation of my visual aid for vehicle operators taken along the line 3—3 of Figure 2 and drawn on a reduced scale.

Figure 4 is a schematic view illustrating the fields of view of the human eyes when viewing a distant object.

Figure 5 is a schematic view similar to Figure 4 illustrating the manner in which a single vertical at close range assists an individual in making a judgment in determining distance to a remote object.

Figure 6 is a schematic view similar to Figure 4 illustrating the use of two verticals at close range in assisting an individual in making a judgment in determining distance to a remote object.

Figure 7 is a schematic view similar to Figure 6 and showing the triangle used for judgment in determining distance using two verticals at close range.

Referring now more particularly to Figures 1 to 3 of the drawings, a vehicle indicated generally by the reference character 10 with which my visual aid is used has a hood 12 on which I mount by any convenient means a housing 14, the underside of which conforms to the shape of the hood 12 and the top of which is formed with an opening or recess 16. A pivot shaft 18 rotatably supported in the housing 14 at the rear thereof carries for rotation with the shaft the grid, indicated generally by the reference character 20, of my visual aid in a position on the vehicle in which it may be moved into the field of view of the operator. A segmental gear 22 carried by shaft 18 for rotation with the shaft is engaged by a worm 24 carried by a shaft 26 rotatably supported in a housing 28 carried by the hood 12. I provide shaft 26 with an elbow joint 30 and form the shaft with a telescoping portion 32 which permits the hood 12 to be raised and lowered without interference from shaft 26. A knob 34 disposed on the dashboard of the vehicle 10 and carried by shaft 26 for rotation with the shaft may be turned in one direction to raise the grid 20 to the position shown in full lines in Figure 2 in view of the driver. Knob 34 may be twisted in the other direction to lower the grid to the broken line position shown in Figure 2 in which the grid rests in the opening or recess 16 of housing 14 out of view of the driver.

As has been explained hereinabove, modern motor vehicles fail to provide the operator with any true horizontals, with respect to the vehicle, from which the surrounding area and attitude of the vehicle can be judged. My grid includes a pair of horizontal guides 36 and 38 carried by or formed integrally with a circular guide 40, the function of which will be described in detail hereinafter. With the grid 20 raised to the full line position shown in Figure 2 in view of the driver and with the vehicle 10 on a level surface, the longitudinal axes of guides 36 and 38 lie in the horizontal plane. It will be appreciated that as the road or terrain over which the vehicle travels rises and falls, the horizontal guides 36 and 38 move with respect to the terrain. In this manner rise and fall of roads and tunnels, for example, is made more apparent to the operator to afford him a quicker and truer appreciation of the real nature of the environment through which the vehicle is passing.

I provide the circular guide 40 with a base 42, the axis of which is a chord of the circle described by the guide 40. This base 42 is the portion of the guide 20 which is disposed on the shaft 18.

Base 42 also supports a pair of spaced vertical guides 44 and 46 which intersect the respective horizontal guides 36 and 38 and which intersect the upper portion of the circular guide 40. With the grid 20 raised in view of the driver and with the vehicle 10 on a level surface, the longitudinal axes of guides 44 and 46 are perpendicular to the horizontal plane. These vertical guides 44 and 46 assist the operator in making those extremely important judgments in which he relies on verticals in his immediate environment. As the vehicle 10 leaves the level and, for example, travels on a banked curve, the vertical guides 44 and 46 move with respect to objects outside the vehicle, thus emphasizing to the driver the fact that his vehicle no longer is on a level surface. These vertical guides provide vertical references for use in making judgments. Such vertical references are not provided by automobiles fashioned in the latest styles.

The circular guide 40 and the points of intersection of the horizontal and vertical guides afford means for judging radial movement, or movement of an object in a direction out of the field of view of the driver. In addition, the circular guide and the points of intersection of the vertical and horizontal guides assist the driver in estimating the rate of apparent change in size of objects being approached to permit the driver to make accurate judgments of his own speed and of the speed of an approaching vehicle, for example. These ready reference guides permit such judgments to be made more quickly and more accurately than is possible where no such guides are available.

In judging the speed of a distant moving object such as an approaching motor vehicle, my grid provides two cues which the operator may use as a basis of his judgment. The first of these is the apparent change in size as the distant vehicle approaches and the second is the rate at which it blocks out more background as it moves in relation to the operator. This latter cue may be termed the "overlay rate." The circular guide 40 and the areas within the circular guide defined by the intersecting horizontal and vertical guides afford ready references for giving these cues to the operator from which he may make his judgments. With the grid 20 close to the operator as he focuses on a distant object the circular guide 40 of the grid 20 is very nearly accepted by the operator as a part of his own optical system.

Referring now to Figures 4 to 7, it may be demonstrated that the vertical guides 44 and 46 enable the operator to obtain an additional cue for his judgment of speed and distance. In Figures 4 to 7, I have schematically indicated the eyes of the operator by the reference characters 48 and 50 and have indicated a distant object being viewed as "X." In these figures the field of vision of the left eye is indicated for purposes of clarity by the area shaded with lines slanted downwardly to the left and the field of vision of the right eye is indicated by shading lines slanting downwardly to the right. The overlapping area of the fields of the respective eyes is the normal field of binocular vision. Normally beyond a distance of 20 feet both eyes receive the same impingement and there is no binocular depth perception. Judgment of distance under these conditions is made partly on the basis of experience and partly by comparison of the object with other known objects in the field of view.

In Figure 5 I have illustrated the use of a single vertical 52 for artificially increasing the range of binocular depth perception. The vertical 52 is disposed at close range to the observer at which it is out of focus but apparent. With the eyes focused on the distant object X, the vertical 52 is seen independently by both eyes and in effect is imprinted on the retina of the eyes. The apparent distance between the images of the vertical affords a reference for judging distance. As the distance to the object X changes, this apparent distance between the images changes. This change in apparent distance between the images occurs outside the normal range of binocular vision to provide a guide for determining distance to far-off objects being viewed. This cue may be termed a "triangulation" cue since it results from movement of the apparent images of the vertical 52 with respect to a triangle defined by lines from the lenses of the eyes to the object X. I have indicated this triangle by horizontal shading lines in Figure 5.

Referring now to Figure 6, rather than employing a single vertical 52 artificially to increase the range of binocular depth perception, I may employ a pair of spaced vertical guides 54 and 56 similar to the guides 44 and 46 of my grid. I so dispose these vertical guides 54 and 56 that both are outside the direct path of focus to the distant object X. While both these vertical guides are seen by both eyes, the right guide 56 will be nearly completely ignored by the left eye 48 and the left guide 54 is very nearly completely ignored by the right eye 50. These two guides then tend to function individually affording triangulation in judging the distance to the object X. In Figure 7 I have illustrated schematically the triangle from which distance is judged with the use of two vertical guides 54 and 56 by the area shaded with horizontal shading lines.

I form the grid 20 from any suitable material such, for example, as a plastic or metal or the like. The various guides of the grid may be individually formed and assembled in any suitable manner such as by an adhesive or the like. Preferably, however, I form the guides of plastic and I may, if desired, mold the entire grid as an integral unit.

In operation of my visual aid for vehicle operators, when the aid is to be used as, for example, in high-speed, superhighway driving, the knob 34 is turned to raise the grid to the full line position shown in Figure 2 into the field of view of the operator. As the vehicle travels through an area, the guides of the grid 20 alert the driver to the changing conditions of the area and to the attitude of his vehicle. For example, as the terrain rises and falls, the horizontal guides 36 and 38 alert the driver to this fact and to the extent of the rise and fall. As the vehicle tilts, for example, when it traverses a banked curve, the vertical guides and the circular guide 40 provide a reference by means of which the operator can make an accurate appraisal of the apparent change in size of a distant object being aproached. This cue, together with the change in overlay which is emphasized by the grid, permit the driver to make a rapid and accurate judgment of the speed of a distant object. These features of the grid also enable the driver to make more accurate and more rapid judgments of radial motion of a distant object. Further, the spaced vertical guides 44 and 46 artificially extend the binocular depth perception to give the driver a better judgment of distance to a remote object.

As the vehicle travels over the modern highway, the grid 20 also aids the driver in overcoming the hynosis induced by constant attention to the roadway. The minor changes upon which the operator ordinarily relies to maintain his awareness are emphasized by the grid. When the grid is not in use, knob 34 may be turned to lower the grid into the recess 16 in housing 14 in which it is out of the field of view of the driver.

It will be seen that I have accomplished the objects of my invention. I have provided a visual aid for vehicle operators which permits the operator to make a more rapid and more accurate evaluation of the area through which the vehicle is passing. My device permits the operator to judge the attitude of his vehicle. It provides the driver with true reference horizontal and vertical guides from which he may make judgments. It also serves to overcome the hynosis induced by operation of a vehicle on modern superhighways.

It will be understood that certain features and subcombinations are of utility and may be employed without reference to other features and subcombinations. This is contemplated by and is within the scope of my claims. It is further obvious that various changes may be made in details within the scope of my claims without departing from the spirit of my invention. It is, therefore, to be understood that my invention is not to be limited to the specific details shown and described.

Having thus described my invention, what I claim is:

1. In a vehicle adapted to be driven through an environment by an operator from a driving position providing the operator with a field of view a visual aid for assisting the operator in judging his relation to the environment including in combination a circular reference guide, means mounting said guide on said vehicle at a location spaced from said driving position to define an area within the field of view of an operator in said driving position, a pair of vertical guides, means mounting said vertical guides in spaced relationship with their axes forming parallel chords of the circle formed by said circular guide, said vertical guides intersecting said circular guide to extend to points in the field of view of the operator outside the area defined by the circular guide, a pair of horizontal guides intersecting said circular guide and the respective vertical guides to define enclosed restricted within the area defined by said circular guide, said horizontal guides extending from points outside the area defined by the circular guide to spaced points within the area defined by the circular guide, said horizontal and vertical reference guides providing true horizontal and vertical references with respect to the vehicle to assist the operator in judging the attitude of the vehicle relative to the environment, said circular guide and said restricted areas assisting the operator in judging his speed with relation to the environment.

2. A visual aid as in claim 1 in which said mounting means comprises a base and means for moving said base from a position at which said visual aid is out of the field of view of the operator to a position at which the visual aid is in the field of view of the operator.

References Cited in the file of this patent

UNITED STATES PATENTS

| | | |
|---|---|---|
| 499,950 | Baillie | June 20, 1893 |
| 1,311,253 | Stern | July 29, 1919 |
| 2,559,761 | Fulton | July 10, 1951 |
| 2,586,807 | Fowler | Feb. 26, 1952 |
| 2,722,054 | Fisher | Nov. 1, 1955 |

FOREIGN PATENTS

| | | |
|---|---|---|
| 2,468 | Great Britain | Feb. 1, 1910 |
| 543,031 | Great Britain | Feb. 6, 1942 |

UNITED STATES PATENT OFFICE
CERTIFICATION OF CORRECTION

November 22, 1960

Patent No. 2,960,772

Seymour Robins

It is hereby certified that error appears in the above numbered patent requiring correction and that the said Letters Patent should read as corrected below.

Column 6, line 18, before "within" insert -- areas --.

Signed and sealed this 2nd day of May 1961.

(SEAL)
Attest:

ERNEST W. SWIDER
Attesting Officer

DAVID L. LADD
Commissioner of Patents